(12) United States Patent
Harrison et al.

(10) Patent No.: US 7,929,691 B2
(45) Date of Patent: Apr. 19, 2011

(54) USE OF BILINEAR MAPPINGS IN CRYPTOGRAPHIC APPLICATIONS

(75) Inventors: Keith Alexander Harrison, Chepstow (GB); Liqun Chen, Bristol (GB); Guido Marco Bertoni, Carnate (IT); Pasqualina Fragneto, Milan (IT); Gerardo Pelosi, Matera (IT)

(73) Assignee: Hewlett-Packard Development Company, L.P., Houston, TX (US)

( * ) Notice: Subject to any disclaimer, the term of this patent is extended or adjusted under 35 U.S.C. 154(b) by 1518 days.

(21) Appl. No.: 11/316,412

(22) Filed: Dec. 21, 2005

(65) Prior Publication Data
US 2008/0016346 A1  Jan. 17, 2008

(30) Foreign Application Priority Data
Dec. 23, 2004  (WO) .................. PCT/IT2004/000723

(51) Int. Cl.
*H04K 1/00* (2006.01)
(52) U.S. Cl. .......................... 380/30; 713/150
(58) Field of Classification Search .................... 380/28, 380/30, 277, 44, 285; 713/172, 174, 180, 713/150, 168; 708/3, 8, 7, 277
See application file for complete search history.

(56) References Cited

U.S. PATENT DOCUMENTS

| 7,113,594 | B2* | 9/2006 | Boneh et al. | 380/28 |
|---|---|---|---|---|
| 7,120,311 | B2* | 10/2006 | Snyder | 382/276 |
| 7,239,701 | B1* | 7/2007 | Ogishi et al. | 380/44 |
| 7,481,363 | B2* | 1/2009 | Zuili | 235/380 |
| 7,587,605 | B1* | 9/2009 | Venkatesan et al. | 380/30 |
| 7,590,236 | B1* | 9/2009 | Boneh et al. | 380/30 |
| 7,594,261 | B2* | 9/2009 | Lauter et al. | 726/14 |
| 7,634,087 | B2* | 12/2009 | Boneh et al. | 380/28 |
| 7,639,799 | B2* | 12/2009 | Lauter et al. | 380/30 |
| 7,769,167 | B2* | 8/2010 | Eisentraeger et al. | 380/30 |
| 2002/0021803 | A1* | 2/2002 | Solinas | 380/30 |
| 2002/0073316 | A1* | 6/2002 | Collins et al. | 713/174 |
| 2003/0081785 | A1 | 5/2003 | Boneh et al. | |
| 2003/0179950 | A1* | 9/2003 | Komura et al. | 382/275 |
| 2004/0064700 | A1* | 4/2004 | Kim et al. | 713/170 |
| 2004/0123098 | A1* | 6/2004 | Chen et al. | 713/155 |
| 2004/0131191 | A1* | 7/2004 | Chen et al. | 380/282 |
| 2004/0139029 | A1 | 7/2004 | Zhang et al. | |
| 2005/0036609 | A1* | 2/2005 | Eisentraeger et al. | 380/30 |

(Continued)

FOREIGN PATENT DOCUMENTS

EP  1 379 024 A1  1/2004

(Continued)

OTHER PUBLICATIONS

Steven D. Galbraith, Keith Harrison, David Soldera, Implementing the Tate pairing, Mar. 8, 2002.*

(Continued)

*Primary Examiner* — Matthew B Smithers
*Assistant Examiner* — Abu Sholeman (57) ABSTRACT

Cryptographic methods are known that involve the computation of a non-degenerate bilinear mapping of first and second elements one of which comprises a secret of a first entity. For a mapping implemented as, for example, a Tate pairing, the mapping is computable by applying a predetermined function to the first and second elements and then exponentiating the result with a known exponent. Improvements in respect of computational loading, size of output, and security are enabled for the first party by arranging for the first entity to carry out only part of the mapping, a second entity being used to complete computation of the mapping. Cryptographic applications using these improvements are also disclosed.

34 Claims, 6 Drawing Sheets

U.S. PATENT DOCUMENTS

2005/0038755 A1* 2/2005 Silverbook et al. ............. 705/67
2005/0262354 A1* 11/2005 Komano ....................... 713/177

FOREIGN PATENT DOCUMENTS

WO    WO03/017559 A2    2/2003

OTHER PUBLICATIONS

Menezes, Applied cryptography, 1197, CRC press LLC, p. 516.*

Galbraith et al, Implementing the Tate paring, Mar. 8, 2002, Trusted E-services Laboratory, HP laboratoris Bristol, p. 1-15.*

Granger et al, On Small characteristic algebraic tori in pairing-based crytography, Jun. 2004, London Mathematical society, 2000 mathematics subject classification 94A60,20G40,11T99, p. 64-85.*

Barreto, P. et al., "Efficient Algorithms for Pairing-Based Cryptosystems" Cryptology Eprint Archive: Report 2002/008, pp. 1-16, XP002355407 (2002).

Boneh, D. et al., "Identity-Based Encryption from the Weil Pairing," Computer Science, vol. 2139, pp. 213-229 (2001).

Boneh, D. et al., "Identity-Based Encryption from the Weil Pairing," SIAM J. of Computing, vol. 32, No. 3, pp. 586-615 (2003).

Granger, R. et al., "Hardware and Software Normal Basis Arithmetic for Pairing Based Cryptography in Characteristic Three," Cryptology Eprint Archive: Report 2004/157 pp. 1-22, XP002355408 (2004).

McCullagh, N. et al., "Efficient and Forward-Secure Identity-Based Signcryption" (May 2004).

Shim, K., "Efficient ID-based authenticated key agreement protocol based on Weil-pairing" Electronics Letters, vol. 39, No. 8, pp. 653-654 (2003).

* cited by examiner

1. B generates random r
2. B computes U = [r]P
3. B outputs U
4. A computes v = f(U,S$_A$)
5. A outputs v
6. B computes m$_1$ = v$^{e_{pub}}$
7. B computes Q$_A$ = H$_1$(ID$_A$)
8. B computes
   m$_2$ = f(R,[r]Q$_A$)$^{e_{pub}}$
9. B compares m$_1$ & m$_2$

USE OF BILINEAR MAPPINGS IN CRYPTOGRAPHIC APPLICATIONS

FIELD OF THE INVENTION

The present invention relates to improving aspects of usage of bilinear mappings in cryptographic applications.

BACKGROUND OF THE INVENTION

The applicability of bilinear mappings to cryptography has been known for some time, particularly for elliptic curve cryptography. To facilitate an understanding of the present invention, a brief review of such bilinear mappings is given below, this review also defining various symbols and terminology used throughout the specification.

In the present specification, G1 and G2 denote two additive groups with elements defined in a ground field GF(q) or an extension field $GF(q^k)$ where q is some power of prime p and k is an integer, and G3 denotes a subgroup of a multiplicative group of $GF(q^k)^*$ where the superscripted star indicates exclusion of the zero value. The groups G1, G2 and G3 are such that there exists a computable bilinear mapping p relating elements in the additive groups G1, G2 to elements in the multiplicative group G3. This bilinear mapping is, for example, a Tate pairing for which:

$$p: G1 \times G2 \rightarrow G3$$

As is well known to persons skilled in the art, for cryptographic purposes, a modified form of the Tate pairing is used that ensures $p(P,P) \neq 1$ where $P \in G1$ and $P \in G2$; however, for convenience, the Tate pairing is referred to below simply by its usual name without labeling it as modified.

Generally, though not necessarily, the elements of the groups G1 and G2 are points on an elliptic curve E (typically, a supersingular elliptic curve) defined over the ground field GF(q) or the extension field $GF(q^k)$. In this case, G1 is a [l]-torsion subgroup of the group G2 and satisfies [l]P=O for all $P \in G1$ where O is the identity element, l is a large prime, and l*cofactor=number of points in G2; additionally, the value of k is the smallest integer for which $l | (q^k-1)$. Both G1 and G3 are of prime order l.

For convenience, the examples given hereinafter will assume that the elements of G1 and G2 are points on an elliptic curve.

As the mapping p between the additive groups G1 and G2, and the multiplicative group G3 is bilinear, then for P, Q, R in the appropriate additive group, both:

$$p(P+Q,R)=p(P,R)*p(Q,R)$$

$$p(P,Q+R)=p(P,Q)*p(P,R)$$

Furthermore, exponents/multipliers can be moved around. Thus, where [a]P represents the scalar multiplication of point P by an integer a (that is, P added to itself a times), then for integers a, b, c $\in Z_l$:

$$p([a]P, [b]Q)^c = p([a]P, [c]Q)^b$$
$$= p([b]P, [c]Q)^a$$
$$= p([b]P, [a]Q)^c$$
$$= p([c]P, [a]Q)^b$$
$$= p([c]P, [b]Q)^a$$
$$= p([ab]P, Q)^c$$
$$= p([ab]P, [c]Q)$$
$$= p(P, [ab]Q)^c$$
$$= p([c]P, [ab]Q)$$
$$= \ldots$$
$$= p([abc]P, Q)$$
$$= p(P, [abc]Q)$$
$$= p(P, Q)^{abc}$$

As is well known to persons skilled in the art, the computation of the Tate pairing is effected as follows $$p(P,Q)=f(P,Q)^{e_{pub}}$$

where f( ) is a predetermined function, and $e_{pub}$ is an exponent formed from known parameters—more particularly:

$$e_{pub}=(q^k-1)/l$$

Further background regarding the application of bilinear maps (and, in particular, the Tate pairing) to cryptographic uses (such as for encryption and signing) can be found in the following references:

G. Frey, M. Müller, and H. Rück. The Tate pairing and the discrete logarithm applied to elliptic curve cryptosystems. *IEEE Transactions on Information Theory*, 45(5): 1717-1719, 1999;

Lawrence C Washington, "Elliptic curves. Number theory and cryptography" ISBN 1-58488-365-0, published 2003 by Chapman and Hall/CRC.

The computation and transmission of the results of bilinear mappings in cryptographic applications can place significant demands on the resources of the entities involved particularly in the case of entities with limited resources such as smartcards and mobile telephones.

It is an object of the present invention to provide improvements in how bilinear mappings are implemented in cryptographic applications, particularly by entities with limited resources.

SUMMARY OF THE INVENTION

According to one aspect of the present invention, there is provided a cryptographic method comprising computing a first non-degenerate bilinear mapping of a first pair of elements one of which is formed by or from a secret of a first entity, the first mapping being computable by applying a predetermined function to said elements and then exponentiating the result with a known exponent; wherein the first mapping is computed by:

the first entity applying said predetermined function to said elements to produce a first intermediate result which it uses to provide an output comprising that result either unexponentiated or exponentiated by a component only of the known exponent; and a second entity acting on said output to complete the computation of the first mapping either as a discrete operation or incorporated within another computation.

According to another aspect of the present invention, there is provided a computational entity for use in a cryptographic method involving computation of a non-degenerate bilinear mapping of two elements by applying a predetermined function to said elements and then exponentiating the result with a known exponent; the entity comprising an input/output interface;
a memory for storing a secret; and
a processor arranged to effect a partial computation only of said mapping with respect to two elements one of which is formed by or from said secret and the other of which is formed by or from an input received through said interface, this partial computation comprising at least the application of said predetermined function, and the processor being further arranged to cause output of the result of the partial computation via the interface.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

In the following, the splitting of the computation of a non-degenerate bilinear map between two entities is described for the case of the bilinear map being a Tate pairing applied to elements in the form of points on an elliptic curve. The terminology, symbols and mathematical background introduced above are to be taken as applying to the embodiments of the invention described below. In particular, the computation of a Tate pairing for points P and Q is taken to be computable as:

$$p(P,Q) = f(P,Q)^{e_{pub}}$$

where f( ) is a predetermined function, and $e_{pub}$ is an exponent formed from known parameters—more particularly:

$$e_{pub} = (q^k - 1)/l$$

where q, k and l have the meanings given them hereinbefore.

In the first and second embodiments of the invention described below with respect to FIGS. 1A-D and FIGS. 2A, B respectively, a first entity A (referenced 10) carries out a partial computation of a first bilinear map with respect to points $P_1 \in G1$ and $Q_1 \in G2$, and passes the result of this partial computation, as output v, to a second entity B (referenced 11); the entity B then completes computation of the mapping. In the versions of the first embodiment described with respect to FIGS. 1C and 1D, the second entity B also computes a second bilinear map, this time with respect to points $P_2 \in G1$ and $Q_2 \in G2$.

With regard to the points $P_1$ and $Q_1$ involved in the first mapping, one of these points comprises a secret held by entity A. Were this not the case, any concerns over the computational loading of entity A could easily be satisfied by exporting the points $P_1$ and $Q_1$ to entity B for the latter to carry out computation of the first mapping. The secret held by the entity A can be a secret point, or a secret precursor used by the entity A to form the secret point each time it is required for the first mapping. For example, the secret precursor could be a secret string which the entity A converts to a point using a mapToPoint function, such functions being known per se. The precursor could, alternatively, be a secret integer from which the entity A generates one of the points $P_1, Q_1$ by scalar multiplication with a non-secret point.

The context of the first and second embodiments is cryptographic usage of bilinear mappings but other usages are possible.

Figure 1A:
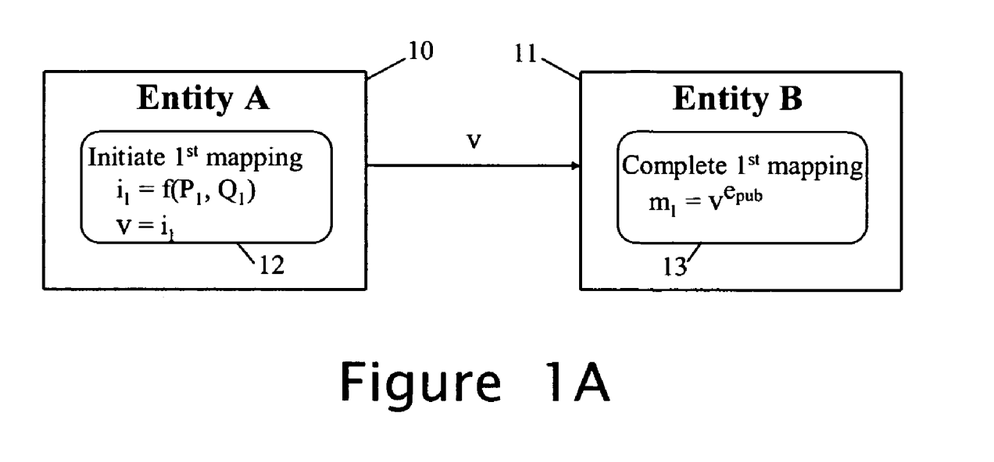
FIG. 1A is a diagram illustrating a first embodiment of the invention in which a first entity effects a partial computation of a first bilinear mapping and a second entity completes computation of the mapping.

Turning now to a more detailed consideration of the first embodiment, as illustrated in FIG. 1A in this embodiment the entity A carries out its partial computation 12 of the first bilinear map by using the aforesaid predetermined function f( ) to compute an intermediate result $i_1$ as:

$$i_1 = f(P_1, Q_1)$$

This intermediate result is then used as the output v passed to entity B. The entity B then completes the computation of the first bilinear map by exponentiating the received quantity v by the aforesaid known exponent $e_{pub}$ to generate the result $m_1$ of the first mapping:

$$m_1 = v^{e_{pub}}$$

In this way, the entity A is relieved of part (up to 30%) of the computational load involved in computing the first bilinear map; however, the secret held by entity A and used for one of the points $P_1, Q_1$ has not been revealed because entity A has carried out the first stage of computing the mapping.

Figure 1B:
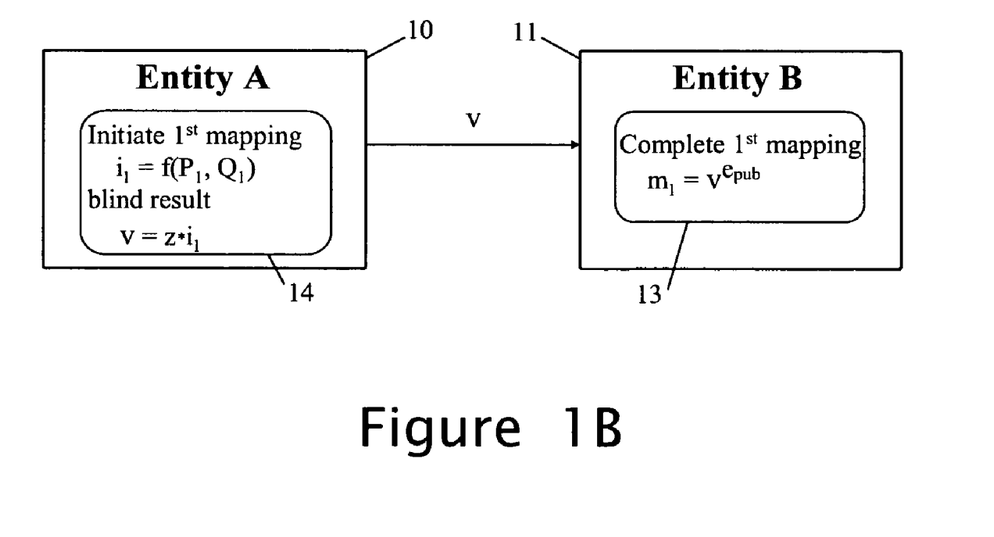
FIG. 1B is a diagram illustrating a variant of the FIG. 1A embodiment in which the first entity blinds the result of its partial computation before passing it to the second entity.

To increase the security of transmission of the partial computation result from entity A to entity B, entity A can blind this result before it is used as the output v. This is illustrated in FIG. 1B where entity A finishes off its processing 14 by multiplying the intermediate result $i_1$ by a blinding factor z; thus:

$$v = z \cdot i_1$$

where $z \in Z^*_p$.

The blinding is automatically removed by the entity B when it exponentiates the quantity v by the exponent $e_{pub}$ without the need to take any other action. The reason for this is that: z raised to the power $(q^k-1)/l = 1$. Whilst this is generally true, it can be readily shown for the case of working in characteristic p (that is, the elements of GF(q) are integers mod p) since in this case k=2 and the term $(q^k-1)$ becomes (p+1)(p-1) with the consequence that z raised to the power $(q^k-1)/l$ includes a term $z^{(p-1)}$; since the computation is being done mod p:

$$z^{(p-1)}=1 \mod p$$

by Fermat's Little Theorem whereby regardless of any remaining term of the exponentiation of z, the result will be 1.

Figure 1C:
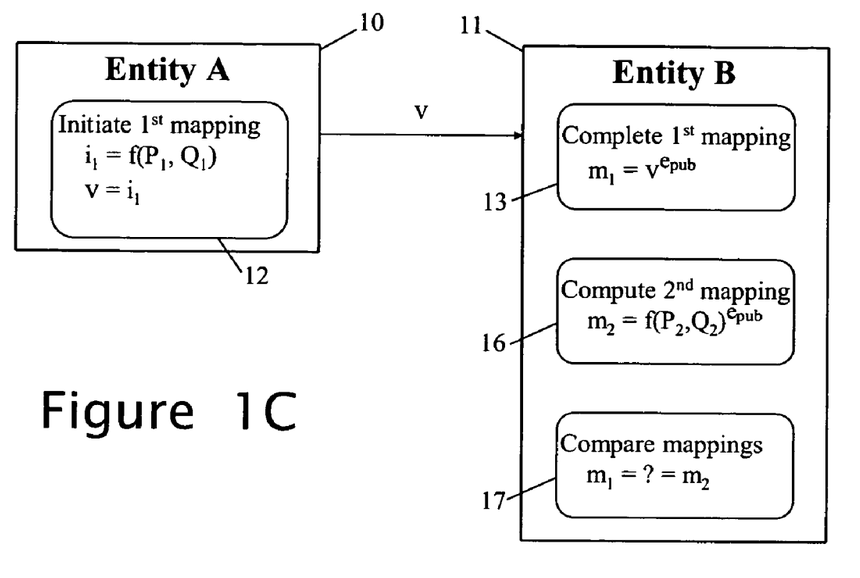
FIG. 1C is a diagram similar to FIG. 1A but illustrating the computation of a second bilinear mapping by the second entity which it then compares with the first mapping.

Frequently, in cryptographic authentication applications the entity B will compute a second mapping and compare it with the result of the first mapping. Such an arrangement is illustrated in FIG. 1C which is similar to FIG. 1A but the entity B now further computes (operation 16) the result $m_2$ of a second mapping effected with respect to points $P_2, Q_2$:

$$m_2 = f(P_2, Q_2)^{e^{pub}}$$

the entity B then comparing the values of $m_1$ and $m_2$ (operation 17) to check if they are equal.

Figure 1D:
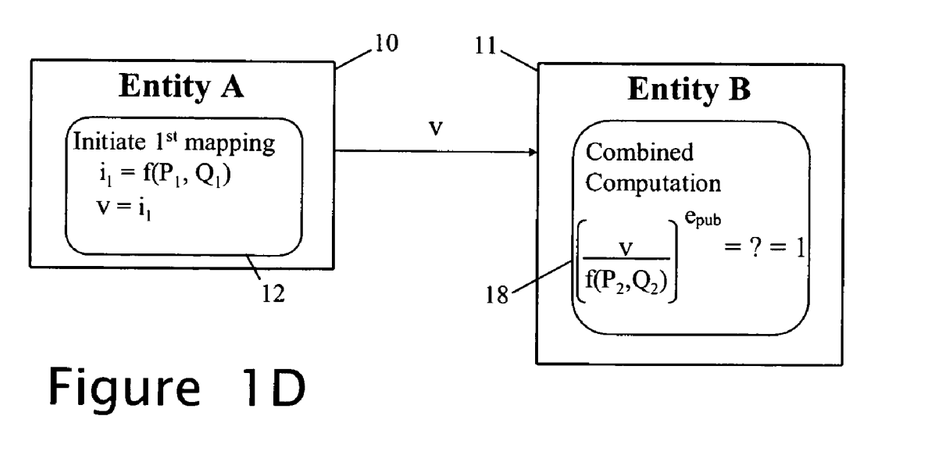
FIG. 1D is a diagram similar to FIG. 1C but illustrating the second entity carrying out its computations in combination.

It can be seen that in the course of the computation effected by the entity B, both the quantity v and the intermediate result $f(P_2, Q_2)$ formed during operation 16, are subject to exponentiation by the exponent $e^{pub}$. In fact, as is illustrated in FIG. 1D, it is possible to take advantage of this to condense the computation effected by entity B into a combined comparison check operation 18:

$$\left(\frac{v}{f(P_2, Q_2)}\right)^{e^{pub}} = ?=1$$

This reduces the computational loading of entity B by 20%-30% as only a single exponentiation is now required.

Figure 2A:
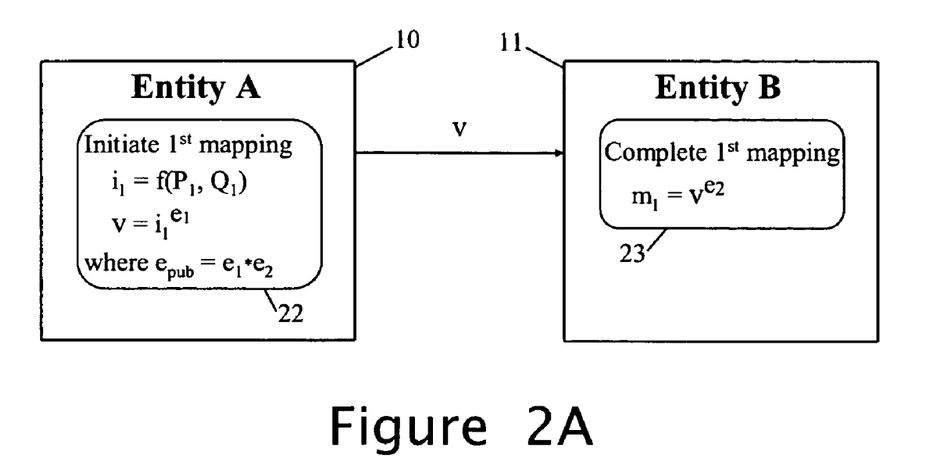
FIG. 2A is a diagram illustrating a second embodiment of the invention in which a first entity effects a partial computation of a first bilinear mapping and a second entity completes computation of the mapping.

The second embodiment of the invention differs from the first embodiment in that in the second embodiment, entity A effects exponentiation by a component $e_1$ of the exponent $e_{pub}$, entity B being left to complete the exponentiation using a complementary component exponent $e_2$ where:

$$e_1 * e_2 = e^{pub}$$

This is illustrated in FIG. 2A where as part of the computation 22 effected by entity A, the intermediate result $i_1$ is exponentiated by $e_1$ to produce the output v:

$$v = i_1^{e_1}$$

Entity B then computes $m_1$ in operation 23 as:

$$m_1 = v^{e_2}$$

An advantageous split of the exponent $e^{pub}$ into two components $e_1$ and $e_2$ is achieved when $e_2$ is set to the value of the 'cofactor' in the above-mentioned relationship:

$$l * \text{cofactor} = \text{number of points in G2}$$

This gives rise to the result of the computation $i_1^{e_1}$ being a multi-element number of unitary value. In this case, the output v provided by the entity A can be provided in a condensed form as the values of all but one element of the multi-element number and the parity of the remaining element (in the context of the present specification, 'parity' means an indication of whether the element is odd or even in value). Because entity B will know that the output v represents a multi-element number of unitary value, it can reconstitute the element in respect of which only its parity was provided. In this way, entity B can re-form $i_1^{e_1}$ and complete the computation of the value $m_1$ of the mapping. Such an arrangement is illustrated in FIG. 2B for the case of working in characteristic p where the form of is a two-element number of the form:

$$a + \sigma b$$

where 'σ' indicates a second dimension. The output v produced by the computation effected by entity A is the element 'a' and the parity of the element 'b'. The entity B re-forms $i_1^{e_1}$ as part of its computation 25 of $m_1$.

Figure 2B:
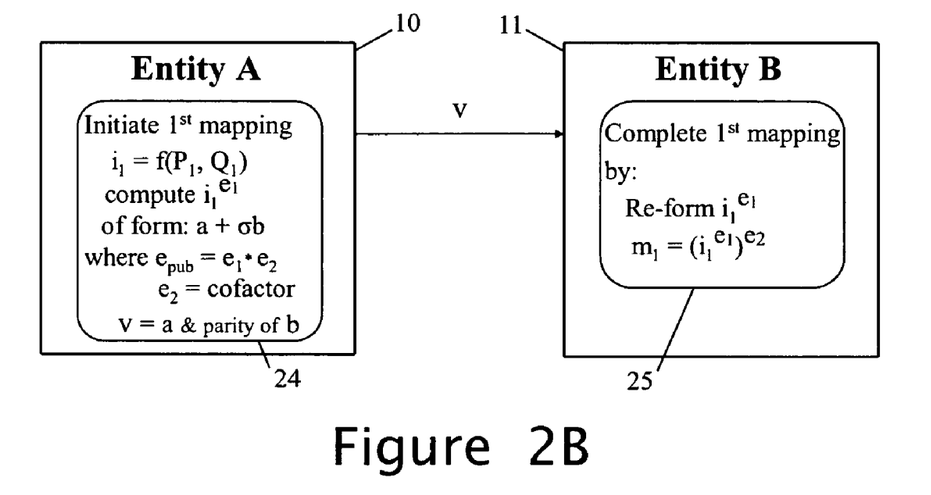
FIG. 2B is a diagram illustrating a particular form of the second embodiment which reduces the amount of data passed from the first entity to the second entity.

It is noted that the extra computational workload placed on entity A by the partial exponentiation effected in the FIG. 2B arrangement is not as great as may first appear. This is because there is a relatively simple way of performing the necessary partial exponentiation. When working in characteristic p using supersingular curves, the number of points in G2 is (p+1) whereby:

$$p+1 = l * \text{cofactor}$$

so that:

$$e_1 = e^{pub}/e_2 = (p^2-1)/l * \text{cofactor} = ((p-1)(p+1))/(p+1) = (p-1)$$

Furthermore, it is known that $(i_1)^p$ is the complex conjugate of $(i_1)$ so that it possible to compute $(i_1)^{p-1}$ as the complex conjugate of $(i_1)$ divided by $(i_1)$.

It will be appreciated that as for the entity B in the versions of the first embodiment illustrated in FIGS. 1C and 1D, the entity B of the second embodiment can be arranged to effect a second bilinear mapping in respect of points $P_2$ and $Q_2$ and then compare the result with the result of the completed first mapping. Again, it is possible to combine the completion of the first mapping, the computation of the second mapping and the comparison of the results of the two mappings, so that exponentiation by the component $e_2$ is only effected once; in this case, the combined computation has the form:

$$\left(\frac{i_1^{e_1}}{f(P_2, Q_2)^{e_1}}\right)^e = ?=1$$

where $i_1^{e_1}$ is either directly v or is re-formed from v.

Figure 3:
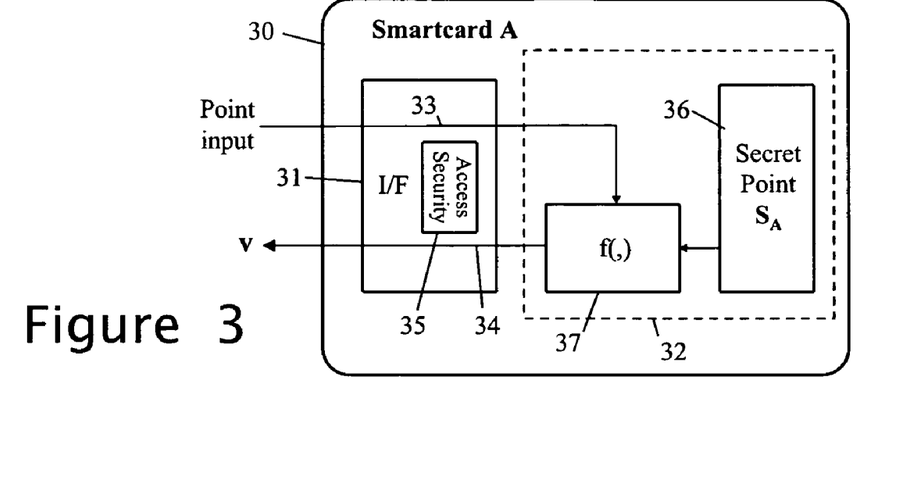
FIG. 3 is a diagram illustrating a smartcard implementation of the first entity of the FIG. 1A embodiment.

FIG. 3 is a block diagram of a smartcard 30 implementing the entity A of the FIG. 1A embodiment of the invention. The smartcard 30 comprises an input/output interface functional block 31 and a cryptographic functional block 32 (shown in dashed outline).

The interface block 31 comprises a data input channel 33, a data output channel 34, and an access security entity 35. The interface block 31 is adapted to permit the smartcard 30 to be coupled with a smartcard interface provided on other apparatus. The access security entity 35 is, for example, implemented to require the input of a PIN code before allowing use of the smartcard 30, this code being input by a user via apparatus with which the smartcard is operatively coupled.

The input channel 33 is arranged to receive a point on an elliptic curve whilst the output channel 34 is arranged to provide the output v.

The cryptographic block 32 of the smartcard 30 comprises a non-volatile memory 36 for holding a secret point $S_A$, and processing block 37 for computing the aforesaid predetermined function f( ) as applied to the point received over the input channel 33 and the secret point $S_A$. The processing block 37 is arranged to output the result of its computation on the output channel 34.

The secret point $S_A$ is, for example, installed at the time of manufacture of the smartcard 30 or subsequently downloaded through a one-time download mechanism built into the card. The secret point $S_A$ is typically generated by a trusted authority. However, where appropriate for the target application of the smartcard 30, it is also possible to have the smartcard internally generate the secret point $S_A$, for example, by applying a mapToPoint function to a randomly generated string. As previously mentioned, rather than storing a secret point $S_A$, the smartcard 30 can be arranged to store a secret precursor from which a point can be formed as and when required.

Four example cryptographic applications of embodiments of the invention will now be described with reference to FIGS. 4 to 7 respectively. All four of these example application employ the FIG. 1A division of computation of a bilinear mapping; this mapping is a mapping initiated by a smartcard entity A which, for the cryptographic applications of FIGS. 4, 5 and 7 takes the form of the FIG. 3 smartcard 30. It is to be understood that the present invention is not limited to these applications and can be used in any cryptographic application or similar usage.

Figure 4:
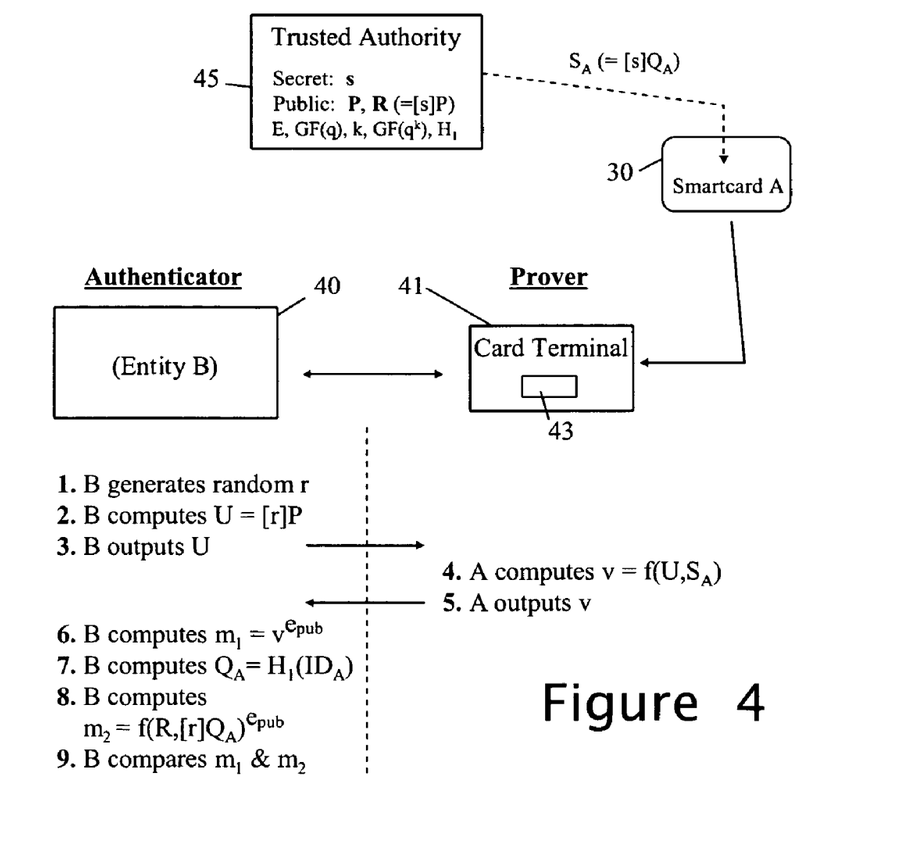
FIG. 4 is a diagram illustrating a first authentication application using the FIG. 3 smartcard.

The FIG. 4 example cryptographic application is an identifier-based authentication method in which entity A, in the form of smartcard 30 interfaced with a card terminal 41, is challenged by entity B, in the form of a remote computer 40, to prove its identity. In this application, a trusted authority 45 plays a central role of establishing system parameters and providing the smartcard 30 with its secret point $S_A$ based on an identifier string $ID_A$ associated with the smartcard 30 (or, more usually, with the party that has control of the smartcard 30).

More particularly, the trusted authority 45 has a secret s, a first public point P and a second public point R formed as R=[s]P. As well as publishing the points P and R, the trusted authority also publishes E, GF(q), k, GF($q^k$), and a mapTo-Point hash function $H_1$ where:

$$H_1: \{0,1\}^* \to G2$$

Publication of the system parameters is not needed if the trusted authority knows that the entities already possess these parameters or can obtain them from some other source. The published parameters enables any recipient party to determine $e_{pub}$; alternatively, $e_{pub}$ can be included as such in the published parameters.

The secret point $S_A$ stored in the smartcard 30 is derived by the trusted authority 45 as:

$$S_A = [S]Q_A$$

where:

$$Q_A = H_1(ID_A)$$

The smartcard 30 when interfaced with the card terminal 41 and enabled by the input of an appropriate PIN via a keypad 43 of the terminal, can communicate (for example, over a network, not shown) with the remote computer 40 (entity B). In order to authenticate the smartcard 30, the remote computer 40 issues a challenge to which the smartcard must respond correctly for the remote computer to trust that the smartcard is associated with the identifier $ID_A$, this identifier having either been provided to the remote computer A in advance of the challenge-response exchange, or along with the response issued by the smartcard 30. The steps of the challenge-response mechanism are set out below, with the step numbering being the same as that shown in FIG. 4:

Challenge by Authenticator Entity B (Remote System 40)
1. B generates a secret random integer $r \in Z^*_l$.
2. B computes U=[r]P
3. B sends U to entity A (smartcard 30) as a challenge.

Response by Prover Entity A (Smartcard 30)
4. A effects partial computation of a first bilinear mapping $p(U,S_A)$ by computing $v=f(U,S_A)$
5. A sends v to entity B (remote system 40) as a response Verification by Authenticating Entity B (Remote System 40)

6. B completes computation of first mapping by computing $m_1 = v^{e_{pub}}$
7. B computes $Q_A = H_1(ID_A)$
8. B computes a second bilinear mapping $p(R,[r]Q_A)$ by computing $$m_2 = f(R,[r]Q_A)^{e_{pub}}$$

9. B compares $m_1$ and $m_2$; if they are equal, B trusts that entity A has an associated identity $ID_A$, otherwise, B does not trust the identity of entity A.

That the first mapping computed in steps 4 and 6 should equal the second mapping computed in step 8 if the correct secret point $S_A$ is used by smartcard 30 in step 4, can be readily shown:

the first mapping is: $p(U,S_A) = p([r]P,[s]Q_A) = p(P,Q_A)^{rs}$ the second mapping is: $p(R,[r]Q_A) = p([s]P,[r]Q_A) = p(P,Q_A)^{sr}$ In a variant of the FIG. 4 authentication method, the secret point $S_A$ stored by entity A is computed by the trusted authority 45 as $[1/s]Q_A$. Then in step 2 the entity B combines the random integer r with the point R (=[s]P) rather than the point P, and in step 8 entity B computes the second bilinear mapping as $p(P,[r]Q_A)$ by computing $m_2 = f(P,[r]Q_A)^{e_{pub}}$.

That the first mapping computed in steps 4 and 6 of this variant of the FIG. 4 authentication method should equal the second mapping computed in step 8 if the correct secret point $S_A$ is used by smartcard 30 in step 4, can be readily shown:

the first mapping is: $p(U,S_A) = p([r][s]P,[1/s]Q_A) = p(P,Q_A)^r$ the second mapping is: $p(P,[r]Q_A) = p(P,Q_A)^r$ The FIG. 5 example cryptographic application is also an identifier-based authentication method and is similar to the FIG. 4 example. More particularly, entity A, in the form of smartcard 30 interfaced with card terminal 41, is challenged by entity B, in the form of a remote computer 40, to prove its identity. Again, trusted authority 45 plays a central role of establishing and publishing system parameters and providing the smartcard 30 with its secret point $S_A$ based on an identifier string $ID_A$ associated with the smartcard 30 (or, more usually, with the party that has control of the smartcard 30).

Figure 5:
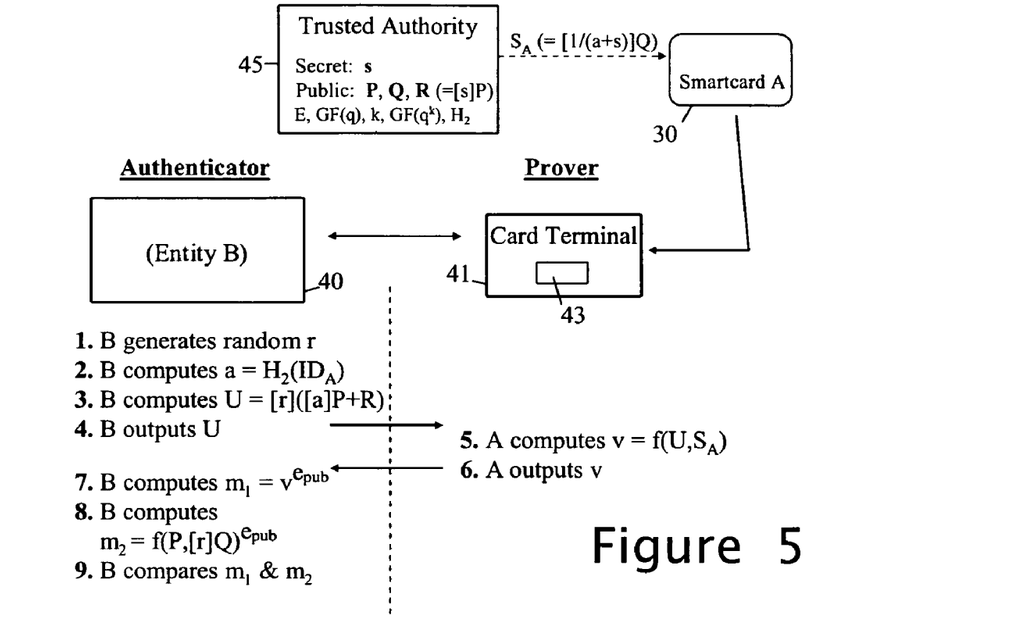
FIG. 5 is a diagram illustrating a second authentication application using the FIG. 3 smartcard.

However, in contrast to the FIG. 4 example, the point $S_A$ is not produced directly from the identifier string $ID_A$ of entity A by a mapToPoint hash function $H_1$ but instead the identifier string is first mapped to an integer "a" using a hash function $H_2$ and A's secret point $S_A$ is then generated as:

$$S_A = [1/(a+s)]Q$$

where Q is a third public point established by the trusted authority 45. This manner of deriving a point from an identifier string is described in the paper by N. McCullagh, P. Barreto entitled "Efficient and Forward-Secure Identity-Based Signcryption", May 2004, locatable in the IACR e-print archive http://eprint.iacr.org.

The trusted authority publishes the points P, Q and R (=[s]P) as well as the other system parameters E, GF(q), k, GF($q^k$), and the hash function $H_2$.

The steps of the FIG. 5 challenge-response authentication mechanism are set out below, with the step numbering being the same as that shown in FIG. 5:

Challenge by Authenticator Entity B (Remote System 40)
1. B generates a secret random integer $r \in Z^*_l$.
2. B computes $a = H_2(ID_A)$
3. B computes U=[r]([a]P+R)
4. B sends U to entity A (smartcard 30) as a challenge.

Response by Prover Entity A (Smartcard 30)

5. A effects partial computation of a first bilinear mapping $p(U,S_A)$ by computing $v=f(U,S_A)$ 6. A sends v to entity B (remote system 40) as a response Verification by Authenticating Entity B (Remote System 40)

7. B completes computation of first mapping by computing $m_1 = v^{epub}$

8. B computes a second bilinear mapping $p(P,[r]Q)$ by computing $$m_2 = f(P,[r]Q)^{epub}$$

9. B compares $m_1$ and $m_2$; if they are equal, B trusts that entity A has an associated identity $ID_A$, otherwise, B does not trust the identity of entity A.

That the first mapping computed in steps 5 and 7 of the FIG. 5 application should equal the second mapping computed in step 8 if the correct secret point $S_A$ is used by smartcard 30 in step 5, can be readily shown:

—the first mapping is:

$$p(U, S_A) = p([a][r]P + [r][s]P, [1/(a+s)]Q)$$
$$= p([r(a+s)]P, [1/(a+s)]Q)$$
$$= p(P, Q)^r$$

—the second mapping is:

$$p(P, [r]Q) = p(P, Q)^r$$

In the foregoing example, A's secret point $S_A$ was generated as $S_A=[1/(a+s)]Q$. In fact, following McCullagh and Barreto, the denominator (a+s) can be generalised to any polynomial in s. In this case, the FIG. 5 method would require the trusted authority 45 to match each term of the polynomial with a corresponding public point based on P and the appropriate power of s—thus, if the polynomial comprised an $s^2$ term and an $s^3$ term (for example: $2s^2+5s^3$), the trusted authority 45 would need to publish both a point $R_2=[S^2]P$ and a point $R_3=[S^3]P$. The challenge element U issued by entity B would then take the form $$U=[r]([a]P+2R_2+5R_3)$$

In a variant of the FIG. 5 authentication method, the secret point $S_A$ stored by entity A is computed by the trusted authority 45 as [a+s]Q. Then in step 3 the entity B combines the random integer r with the point P rather than the point R, and in step 8 entity B computes the second bilinear mapping as $p(R,[r]Q)*p([a]P,[r]Q)$; as can be seen, the second mapping is, in fact, two mappings.

That the first mapping computed in steps 5 and 7 of this variant of the FIG. 5 authentication method should equal the second mapping computed in step 8 if the correct secret point $S_A$ is used by smartcard 30 in step 4, can be readily shown:

—the first mapping is:

$$p(U, S_A) = p([r]P, [a+s]Q)$$
$$= p(P, Q)^{r(a+s)}$$

—the second mapping is:

—continued $$p(R, [r]Q) * p([a]P, [r]Q) = p([s]P, [r]Q) * p([a]P, [r]Q)$$
$$= p([a+s]P, [r]Q)$$
$$= p([P, Q)^{r(a+s)}$$

The identifier-based authentication methods disclosed above with reference to FIGS. 4 and 5, together with their described variants, possess a common set of features, namely:

the trusted authority 45, with secret s, makes available multiple public elements comprising at least a first public element (point P) and a second public element (point R) formed as a combination of the first public element P and the secret s;

the first entity A has a secret element (point $S_A$) derived by the trusted authority 45 using both an identifier string $ID_A$ of the first entity A and the trusted-authority secret s;

the second entity B issues a challenge to the first entity A, this challenge comprising a challenge element U formed using at least one of the public elements (points P, R) and a random integer r generated by the second entity;

the first entity A responds to the challenge by initiating computation of a first mapping using a first element formed by or from the secret point $S_A$ of the first entity and a second element formed by or from the challenge element U, the first entity A returning output v as a response to the challenge of the second entity B; and the second entity B completes the computation of the first mapping, computes a second mapping with the use of the random integer r, and compares the results of the first and second mappings; and the challenge element U and the elements of the second mapping, taken together, indirectly involve the identifier string $ID_A$ of the first entity A and the trusted-authority secret s in such a way that the result of the first mapping can only equal the result of the second mapping if the secret point $S_A$ of the first entity A has been used to form one of the elements to which the first mapping is applied.

For the FIG. 4 embodiment and its variant, it will be appreciated that the secret $S_A$ of the first entity A is a combination of the trusted-authority secret s and a first-entity identity element $Q_A$ formed by applying a first hash-based function $H_1$ to the identity string $ID_A$ of the first entity A; it will be further appreciated that one element taken from the group comprising the challenge element U and an element of said second pair of elements, is formed by or from the second public element R such as to balance out the use of the trusted-authority secret s in the first mapping as a component of the secret $S_A$ of the first entity A. For the FIG. 5 embodiment and its variant, it will be appreciated that the secret $S_A$ of the first entity A is a combination of the trusted-authority secret s, a quantity 'a' formed by applying a second hash-based function $H_2$ to the identity string $ID_A$ of the first entity A, and a third public element Q of the aforesaid multiple public elements; it will also be appreciated that one element taken from the group comprising the challenge element U and an element of said second pair of elements, is formed by or from the second public element R such as to balance out the use of the trusted-authority secret s in the first mapping as a component of the secret $S_A$ of the first entity A.

Figure 6:
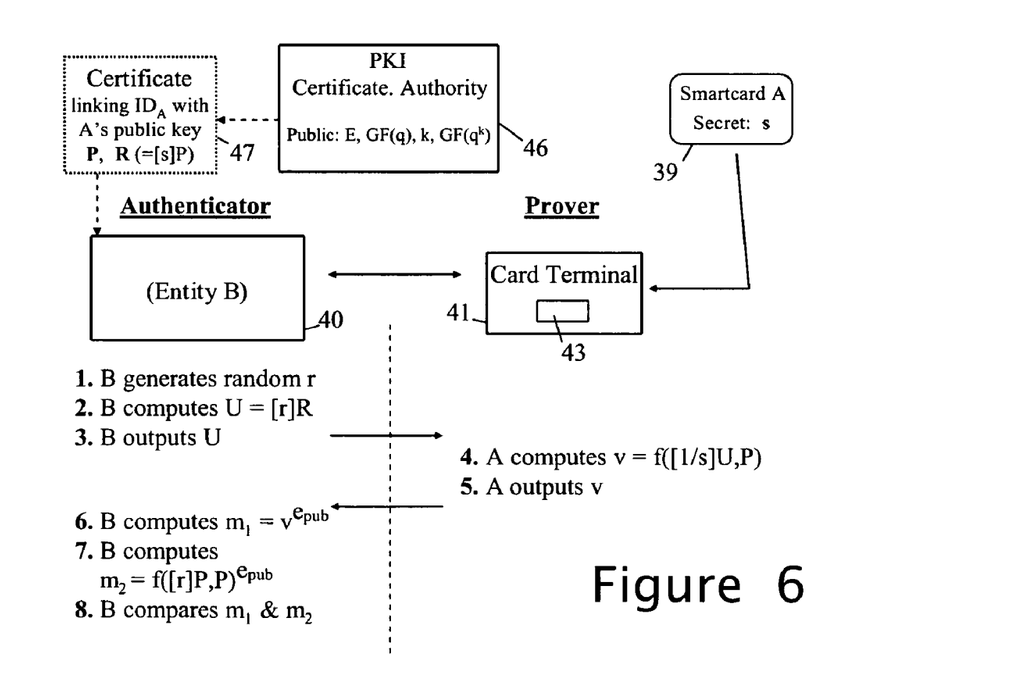
FIG. 6 is a diagram illustrating a third authentication application using a modified form of the FIG. 3 smartcard.

The FIG. 6 example cryptographic application is a PKI (Public Key Infrastructure) authentication method in which a certificate 47 issued by a trusted certificate authority 46 links the identity $ID_A$ of entity A to a public key of a public/private key pair the private key of which is held by entity A. More particularly, the entity A has a private key s and a public key (P, R) where R and P are both points and R=[s]P. Entity A stores its public/private key pair and the certificate authority, as well as publishing the certificate 47 also publishes E, GF(q), k, and GF(q$^k$) unless these parameters are made available in some other manner. As the theory and practice of public key infrastructures are well known to persons skilled in the art, these will not be discussed further herein.

As in the preceding examples, the entity A takes the form of a smartcard 39 though the form of this smartcard is different from the card 30 used in the preceding examples as now the secret (private key) held by the smartcard 39 takes the form of a number rather than a point. The processing effected by smartcard 39 is also different to that carried out by card 30 as will be seen hereinafter.

As with the smartcard 30 in the applications of FIGS. 4 and 5, in the FIG. 6 application, the smartcard 39 is arranged to interface via card terminal 41 with an entity B. The entity B authenticates entity A by using the public key of entity A (reliably known from certificate 47) to issue a challenge which only an entity knowing the secret key s of entity A can respond to correctly.

The steps of the FIG. 6 challenge-response authentication mechanism are set out below, with the step numbering being the same as that shown in FIG. 6:

Challenge by Authenticator Entity B (Remote System 40)
1. B generates random integer $r \in Z^*_1$.
2. B computes U=[r]R
3. B sends U to entity A (smartcard 39) as a challenge.

Response by Prover Entity A (Smartcard 39)
4. A effects partial computation of a first bilinear mapping p([1/s]U,P) by computing $$v=f([1/s]U,P)$$

5. A sends v to entity B (remote system 40) as a response

Verification by Authenticating Entity B (Remote System 40)
7. B completes computation of first mapping by computing
$$m_1=v^{epub}$$
8. B computes a second bilinear mapping p(P,[r]P) by computing $$m_2=f(P,[r]P)^{epub}$$

9. B compares $m_1$ and $m_2$; if they are equal, B trusts that entity A has an associated identity $ID_A$, otherwise, B does not trust the identity of entity A.

Figure 7:
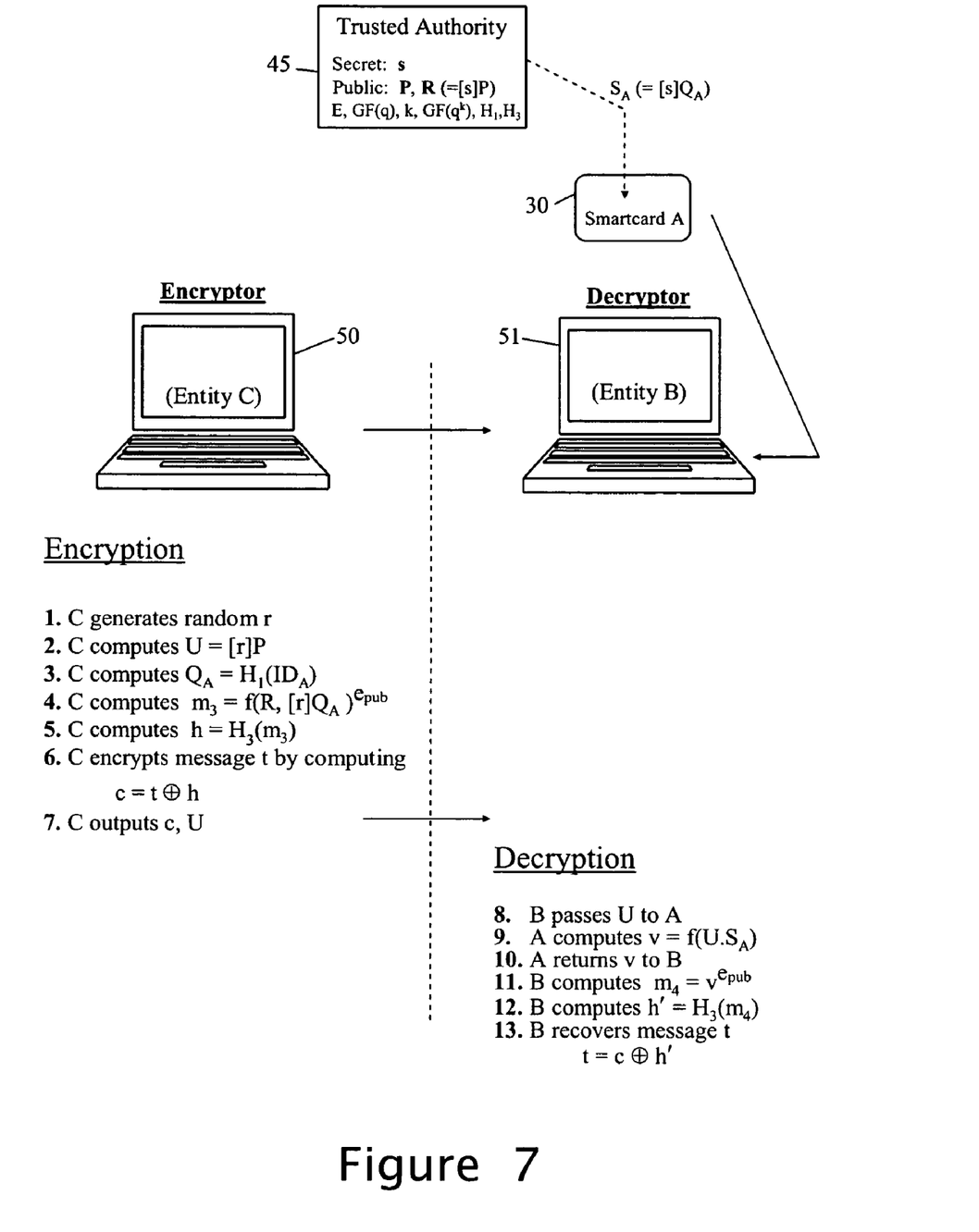
FIG. 7 is a diagram illustrating an encryption-decryption application using the FIG. 3 smartcard.

That the first mapping computed in steps 4 and 6 of the FIG. 6 application should equal the second mapping computed in step 8 if the correct secret s is used by smartcard 39 in step 4, can be readily shown:

the first mapping is: $p([1/s]U,P)=p([1/s][r][s]P,P)=p(P,P)^r$ the second mapping is: $p(P,[r]P)=p(P,P)^r$ The fourth cryptographic application, depicted in FIG. 7, is an identifier-based encryption-decryption method in which the decryptor comprises a computer 51 acting as entity B, and a smartcard 30 forming entity A. The party controlling the smartcard 30 has an associated identifier-based public/private key pair, the public key being an identifier string $ID_A$, and the private key being the secret point $S_A$ stored in the smartcard. As with the FIG. 4 embodiment, a trusted authority 45 with secret s, has computed the secret $S_A$ as:

$$S_A=[s]Q_A=[s]H_1(ID_A)$$

where $H_1$ is the hash function mentioned above in relation to the FIG. 4 application. The trusted authority 45 publishes the system parameters as already described for the FIG. 4 application, including the points P and R (=[s]P).

When an encryptor entity C with computer 50 wishes to send a message t securely to the party controlling the smartcard 30, the encryptor entity C obtains, in any suitable manner trusted by the encryptor entity, the public key $ID_A$ of the intended recipient. The encryption process then proceeds as follows (the step numbering being that used in FIG. 7):

Message Encryption by Encryptor (Computer 50)
1. C generates random integer $r \in Z^*_1$.
2. C computes U=[r]P
3. C computes $Q_A=H_1(ID_A)$
4. C computes a bilinear mapping $p(R,[r]Q_A)$ by computing:

$$m_3=f(R,[r]Q_A)^{epub}$$

5. C computes $h=H_3(m_3)$ where $H_3$ is a hash function that hashes $m_3$ to a bit string of the same length as the bit string formed by the message t.
6. C encrypts message t as ciphertext c by computing:

$$c=t \oplus h$$

where $\oplus$ is the Exclusive OR function
7. C sends <c,U> to decryptor computer 51 (entity B).

Message Decryption by Decryptor Entities A and B (Smartcard 30 and Computer 51)

To decrypt the message, the recipient inserts smartcard 30 into an appropriate interface of computer 51 and enables the smartcard by entering the PIN via the keyboard of the computer 51. Decryption then proceeds as follows:

8. B passes U to entity A (the smartcard 30)
9. A effects partial computation of a bilinear mapping $P(U,S_A)$ by computing $$v=f(U,S_A)$$

10. A returns v to entity B (computer 51)
11. B completes the computation of the mapping started by A $$m_4=v^{epub}$$

12. B computes a value h' which should correspond to the value h computed by entity C (computer 50) in step 5 provided that the secret point $S_A$ is the private key corresponding to the public key used by entity C in deriving h.

$$h'=H_3(m_4)$$

13. B recovers the message t:

$$t=c \oplus h'$$

The general form of the encryption-decryption algorithm is known but not the split of computation between entities A and B for deriving the mapping result $m_4$.

That the mapping computed in step 4 should equal the second mapping computed in steps 9 and 11 if the correct secret point $S_A$ is used by smartcard 30 in step 9, can be readily shown:

step 4 mapping is: $p(R,[r]Q_A)=p([s]P,[r]Q_A)=p(P,Q_A)^{sr}$ steps 9 & 11 mapping is: $p(U,S_A)=p([r]P,sQ_A)=p(P,Q_A)^{rs}$ By effecting partial computation of the mapping $p(U,S_A)$ within the smartcard 30, the secret $S_A$ is not revealed to the computer 51 so that the party controlling the smartcard may be willing to use a less secure computer 51 than if the computer had to use the secret $S_A$ to effect decryption.

It will be appreciated that many variants are possible to the above described embodiments of the invention. In particular, rather than the elements such as $P_1$, $Q_1$ and $P_2$, $Q_2$ being points on an elliptic curve, they could be any elements with the appropriate mathematical properties enabling a non-degenerate computable bilinear map to be provided. It is also to be understood that the present invention is not limited to the Tate pairing and can be applied to any bilinear mapping computable as a predetermined function of the elements concerned followed by an exponentiation of the result.

It will be further appreciated that whilst certain explanatory passages given above have been given with examples working in characteristic p, this is not intended to limit the scope of the present invention and working in other characteristics, such as characteristic 2 or characteristic 3 is also possible.

Although only the entity A of the FIG. 1A embodiment has been shown implemented as a smartcard, it will be appreciated that any of the forms of entity A described above with reference to embodiments of the invention can be implemented as a smartcard. Other implementations of entity A are as part of a mobile telephone, as a plug-in module for use with a computer (for example, a USB module for plugging into a USB port of a computer such as a portable computer), and built into a computer. The entity B whilst typically a computer, can be any suitable computational apparatus including a set-top box, server, or a mobile telephone. The implementations of the entities A and B can be as dedicated hardware processing circuits, as program-controlled general purpose processors with associated programs, or any combination of the two.

With regard to the four cryptographic applications described above with reference to FIGS. 4 to 7, whilst the computation of the mapping initiated by entity A has been described as being effected in accordance with the FIG. 1A embodiment of the invention, the computation of this mapping in these example applications can be effected in accordance with any of the embodiments described above with reference to FIGS. 1 and 2. Furthermore, persons skilled in the art will appreciate that explicit exponents and multipliers can be moved around within the mappings stated for these applications so that the stated forms of these mappings are to be interpreted as covering all equivalents derivable by moving the explicit exponents and multipliers.

The invention claimed is:

1. A cryptographic method comprising computing a first non-degenerate bilinear mapping of a first pair of elements one of which is formed by or from a secret of a first entity, the first mapping being computable by applying a predetermined function to said elements and then exponentiating the result with a known exponent; wherein the first mapping is computed by:
 a first processor or computer of the first entity applying said predetermined function to said elements to produce a first intermediate result which the first entity uses to provide an output comprising that result either unexponentiated or exponentiated by a component only of the known exponent; and
 a second processor or computer of a second entity that is not in possession of the secret of the first entity acting on said output to complete the computation of the first mapping either as a discrete operation or incorporated within another computation.

2. A method according to claim 1, wherein the output provided by the first entity comprises the first intermediate result without exponentiation, the second entity exponentiating said output by the known exponent to complete computation of the first mapping.

3. A method according to claim 2, wherein the second entity also computes a second mapping by applying said predetermined function to a second pair of elements to produce a second intermediate result that it then exponentiates by said known exponent; the second entity comparing the results of the first and second mappings.

4. A method according to claim 3, wherein the exponentiation and comparison effected by the second entity are effected as a combined computation by dividing one of said output and the second intermediate result by the other, and exponentiating the result of this division by said known exponent.

5. A method according to claim 2, wherein the output provided by the first entity comprises the first intermediate result multiplied by a random blinding element, this element being removed automatically upon the second entity exponentiating said output by the known exponent.

6. A method according to claim 1, wherein said bilinear mapping is the Tate pairing of the form:

$$G1 \times G2 \rightarrow G3$$

where:
 G1 and G2 are additive groups formed by the set of points of an elliptic curve defined over a ground field GF(q) or an extension field $GF(q^k)$ where q is a prime power and k is an integer constant, and
 G3 is a subgroup of a multiplicative group of $GF(q^k)^*$;
 said elements being points in G1 and G2 with the group G1 being an [l]-torsion subgroup of G2 such that [l]P=O for all P∈G1 where O is the identity element; the value of k being the smallest integer for which l divides $(q^k-1)$ and said known exponent being $(q^k-1)/l$.

7. A method according to claim 3, wherein the method is an identifier-based authentication method in which a trusted authority with a trusted-authority secret makes available multiple public elements comprising a first public element and a second public element formed as a combination of the first public element and the trusted-authority secret, and further in which the secret of the first entity is an element derived by the trusted authority using both an identifier string of the first entity and the trusted-authority secret; the method comprising:
 the second entity issuing a challenge to the first entity, this challenge comprising a challenge element formed using at least one said public element and a random integer generated by the second entity;
 the first entity responding to the challenge by initiating computation of the first mapping using as the first pair of elements the said element formed by or from the secret of the first entity and an element formed by or from the challenge element, the first entity returning said output as a response to the challenge of the second entity; and
 the second entity completing the computation of the first mapping, computing the second mapping with the use of said random integer, and comparing the results of the first and second mappings;
 the challenge element and the second pair of elements, taken together, involving indirectly the identifier string of the first entity and the trusted-authority secret in such a way that the result of the first mapping can only equal the result of the second mapping if the secret of the first entity has been used to form one of the elements of said first pair of elements.

8. A method according to claim 7, wherein the secret of the first entity is a combination of the trusted-authority secret and a first-entity identity element formed by applying a first hash-based function to the identity string of the first entity; one element taken from the group comprising the challenge element and an element of said second pair of elements, being formed by or from the second public element such as to balance out the use of the trusted-authority secret in the first mapping as a component of the secret of the first entity.

9. A method according to claim 8, wherein the challenge element is a combination of the random integer and the first public element, and the second pair of elements comprises an element formed by or from the second public element and an element formed by or from said first-entity identity element.

10. A method according to claim 8, wherein the challenge element is a combination of the random integer and the second public element, and the second pair of elements comprises an element formed by or from the first public element and an element ([r]$Q_A$) formed by or from said first-entity identity element.

11. A method according to claim 7, wherein the secret of the first entity is a combination of the trusted-authority secret, a quantity formed by applying a second hash-based function to the identity string of the first entity, and a third public element of said multiple public elements; one element taken from the group comprising the challenge element and an element of said second pair of elements, being formed by or from the second public element such as to balance out the use of the trusted-authority secret in the first mapping as a component of the secret of the first entity.

12. A method according to claim 11, wherein the challenge element is a combination of the random integer, the first and second public elements, and the quantity formed by applying the second hash-based function to the identity string of the first entity; and wherein the second pair of elements comprises an element formed by or from the first public element and an element formed by or from the third public element.

13. A method according to claim 12, wherein:
the said combination forming the secret of the first involves a polynomial in the trusted-authority secret;
the multiple public elements made available by the trusted authority includes a multiple second public elements each of which is a combination of the first public element and a respective one of the terms of said polynomial; and
the challenge element issued by the second entity is a combination of the random integer, the first public element, and said multiple second public elements.

14. A method according to claim 1, wherein the output provided by the first entity comprises the first intermediate result exponentiated by a first component only of the known exponent, the second entity completing computation of the first mapping by exponentiating said output by a second component of the known exponent.

15. A method according to claim 14, wherein the second entity also computes a second mapping by applying said predetermined function to a second pair of elements to produce a second intermediate result that it then exponentiates by said known exponent; the second entity comparing the results of the first and second mappings.

16. A method according to claim 15, wherein the second entity completes computation of the first mapping, computes said second mapping and compares the results of the first and second mappings, as a combined computation by:
computing a third intermediate result by exponentiating the second intermediate result by said first component of the known exponent,
dividing one of said output and the third intermediate result by the other, and
exponentiating the result of this division by the second component of said known exponent.

17. A method according to claim 14, wherein the result of the exponentiation of the first intermediate result effected by the first entity is a multi-element number of unitary value, said output provided by the first entity being provided in the form of the values of all but one element of said number and the parity of said one element (b) of the number.

18. A method according to claim 14, wherein said bilinear mapping is the Tate pairing and has the form:

$G1 \times G2 \to G3$ where:
G1 and G2 are additive groups formed by the set of points of an elliptic curve defined over a ground field GF(q) or an extension field GF($q^k$) where q is a prime power and k is an integer, and
G3 is a subgroup of a multiplicative group of GF($q^k$)*;
said elements ($P_1$, $Q_1$; $P_2$, $Q_2$) being points in G1 and G2 with the group G1 being an [l]-torsion subgroup of G2 such that [l]P=O for all P∈G1 where O is the identity element; the value of k being the smallest integer for which l|($q^k$−1) and said known exponent ($e_{pub}$) being:

($q^k$−1)/l said second component of the known exponent ($e_{pub}$) being equal to the number of points in G2 divided by l.

19. A method according to claim 15, wherein the method is an identifier-based authentication method in which a trusted authority with a trusted-authority secret makes available multiple public elements comprising a first public element and a second public element formed as a combination of the first public element and the trusted-authority secret, and further in which the secret of the first entity is an element derived by the trusted authority using both an identifier string of the first entity and the trusted-authority secret; the method comprising:
the second entity issuing a challenge to the first entity, this challenge comprising a challenge element formed using at least one said public element and a random integer generated by the second entity;
the first entity responding to the challenge by initiating computation of the first mapping using as the first pair of elements the said element formed by or from the secret of the first entity and an element formed by or from the challenge element, the first entity returning said output as a response to the challenge of the second entity; and
the second entity completing the computation of the first mapping, computing the second mapping with the use of said random integer, and comparing the results of the first and second mappings;
the challenge element and the second pair of elements, taken together, involving indirectly the identifier string of the first entity and the trusted-authority secret in such a way that the result of the first mapping can only equal the result of the second mapping if the secret of the first entity has been used to form one of the elements of said first pair of elements.

20. A method according to claim 19, wherein the secret of the first entity is a combination of the trusted-authority secret and a first-entity identity element formed by applying a first hash-based function to the identity string of the first entity; one element taken from the group comprising the challenge element and an element of said second pair of elements, being formed by or from the second public element such as to balance out the use of the trusted-authority secret in the first mapping as a component of the secret of the first entity.

21. A method according to claim 20, wherein the challenge element is a combination of the random integer and the first public element, and the second pair of elements comprises an element formed by or from the second public element and an element formed by or from said first-entity identity element.

22. A method according to claim 20, wherein the challenge element is a combination of the random integer and the second public element, and the second pair of elements comprises an element formed by or from the first public element and an element ($[r]Q_A$) formed by or from said first-entity identity element.

23. A method according to claim 19, wherein the secret of the first entity is a combination of the trusted-authority secret, a quantity formed by applying a second hash-based function to the identity string of the first entity, and a third public element of said multiple public elements; one element taken from the group comprising the challenge element and an element of said second pair of elements, being formed by or from the second public element such as to balance out the use of the trusted-authority secret in the first mapping as a component of the secret of the first entity.

24. A method according to claim 23, wherein the challenge element is a combination of the random integer, the first and second public elements, and the quantity formed by applying the second hash-based function to the identity string of the first entity; and wherein the second pair of elements comprises an element formed by or from the first public element and an element formed by or from the third public element.

25. A method according to claim 24, wherein:
the said combination forming the secret of the first involves a polynomial in the trusted-authority secret;
the multiple public elements made available by the trusted authority includes a multiple second public elements each of which is a combination of the first public element and a respective one of the terms of said polynomial; and
the challenge element issued by the second entity is a combination of the random integer, the first public element, and said multiple second public elements.

26. A computational entity for use in a cryptographic method involving computation of a non-degenerate bilinear mapping of two elements by applying a predetermined function (f) to said elements and then exponentiating the result with a known exponent; the entity comprising
an input/output interface;
a memory storing a secret of a first party; and
a processor arranged to effect a partial computation only of said mapping with respect to two elements one of which is formed by or from said secret and the other of which is formed by or from an input received through said interface, this partial computation comprising the application of said predetermined function, and the processor being further arranged to cause output of the result of the partial computation via the interface to a computational entity of a second party.

27. An entity according to claim 26, wherein the processor is arranged to effect said partial computation by applying said predetermined function to said elements to form, without exponentiation, the said result of the partial computation.

28. An entity according to claim 27, wherein the processor is further arranged to blind the said result of the partial computation before causing its output via the interface, the processor being arranged to effect this blinding by multiplying the result of the partial computation by a random blinding element.

29. An entity according to claim 26, wherein the processor is arranged to effect said partial computation by applying said predetermined function to said elements to generate an intermediate result which the processor then exponentiates by a first component only of the known exponent thereby to form said result of the partial computation.

30. An entity according to claim 29, wherein the said result of the partial computation is a multi-element number of unitary value, the processor being arranged to cause this result to be output in the form of the of all but one element of said number and the parity of said one element of the number.

31. An entity according to claim 26, wherein the processor is adapted to effect said mapping as a Tate pairing of the form:

$$G1 \times G2 \to G3$$

where:
G1 and G2 are additive groups formed by the set of points of an elliptic curve defined over a ground field $GF(q)$ or an extension field $GF(q^k)$ where q is a prime power and k is an integer constant, and
G3 is a subgroup of a multiplicative group of $GF(q^k)^*$;
said elements being points in G1 and G2 with the group G1 being an [l]-torsion subgroup of G2 such that $[l]P=O$ for all $P \in G1$ where O is the identity element; the value of k being the smallest integer for which l divides $(q^k-1)$ and said known exponent being $(q^k-1)/l$.

32. An entity according to claim 26, wherein the entity is a smartcard.

33. An entity according to claim 26, wherein the entity is a mobile telephone.

34. An entity according to claim 26, wherein the entity is a module intended to be plugged into an external interface of a computer.

* * * * *